United States Patent [19]

Failla

[11] Patent Number: 4,509,554
[45] Date of Patent: Apr. 9, 1985

[54] HIGH AND LOW PRESSURE, QUICK-DISCONNECT COUPLING

[76] Inventor: William G. Failla, 1 Rutgers Ct., Belleville, N.J. 07109

[21] Appl. No.: 533,601

[22] Filed: Sep. 19, 1983

Related U.S. Application Data

[63] Continuation-in-part of Ser. No. 439,992, Nov. 8, 1982, abandoned.

[51] Int. Cl.³ .............................................. F16L 37/08
[52] U.S. Cl. ............................. 137/614.05; 137/329.1; 137/630.22; 137/614.04
[58] Field of Search .................... 137/614.02, 614.03, 137/614.04, 614.05, 630.22, 329.1

[56] References Cited

U.S. PATENT DOCUMENTS

| | | | |
|---|---|---|---|
| 1,331,720 | 2/1920 | Paterson | 137/630.22 |
| 1,580,618 | 4/1926 | Lovequist et al. | 137/630.22 |
| 2,518,299 | 8/1950 | Fernandez | 137/614.04 |
| 2,905,487 | 9/1959 | Schifter | 137/329.1 |
| 3,931,829 | 1/1976 | McWhinnie, Jr. et al. | 137/329.1 |

*Primary Examiner*—A. Michael Chambers
*Attorney, Agent, or Firm*—M. K. Silverman; J. A. Giampapa

[57] ABSTRACT

There is disclosed a coupling device, which can be connected or disconnected quickly, capable of operation in both high and low pressure environments, and in applications where shock and extreme vibration may be present. Interconnection is accomplished via complimentarily-threaded male and female members. These members each contain an inner and outer valve assembly, arranged in such a manner that the inner valves open prior to the opening of the outer valves, thus permitting equalization of pressure (termed "venting") to develop between the male and female sides of the coupling before fluid flow is initiated. Ease of manufacture is facilitated through modularized valving and spring biased structure, while the device's symmetrical design allows for complete reversability of inputs and outputs. The instant coupling is intended for use with hydraulic and/or other types of fluid flow lines, particularly where said lines may be under pressure.

5 Claims, 5 Drawing Figures

HIGH AND LOW PRESSURE, QUICK-DISCONNECT COUPLING

REFERENCE TO RELATED APPLICATION

This application is a continuation-in-part of Ser. No. 439,992, filed Nov. 8, 1982, now abandoned and entitled "Anti-vibration high-pressure quick-disconnect Coupling."

BACKGROUND OF THE INVENTION

The present invention relates to couplings and, more particularly, to readily detachable couplings suitable for usage in both high and low pressure environments. The coupling is intended for use with hydraulic and other fluid lines which may be under pressure when one end is charged, when both ends are charged and/or when neither end is charged. The present invention seems to satisfy certain long felt needs, including safety needs, in the coupling area, which have not been met by the prior art.

The prior art as best known to the inventor, is believed to appear primarily in U.S. Class #137, Sub-Classes 614.04 and 630.22, and is characterized by such patents as U.S. Pat.No. 1,580,618 to Lovequist; U.S. Pat. No. 2,518,299 to Fernandez; U.S. Pat. No. 2,931,668 to Baley; U.S. Pat. No. 3,217,747 to Voisine; U.S. Pat. No. 3,174,508 to Zahuranec; U.S. Pat. No. 3,520,331 to Locke; and U.S. Pat. No. 3,918,492 to Karcher.

The art, reflected in the above, does not disclose a quick-disconnect coupling suitable for use in the many high and low pressure environments in which vibration is also present. Such prior art designs as do exist have not been suitable for use in both high and low pressure applications where the fluid flowing through the coupling is or may be exposed to extreme vibration.

SUMMARY OF THE INVENTION

The present invention constitutes a quick-disconnect coupling having an elongate male element characterized by a longitudinal axial bore having first and second regions separated by an orifice, and also having an annular third region surrounding the first region. Also included in the coupling design is an elongate female element having a longitudinal bore including first, second and third regions, separated respectively by orifices, in which the external surface of a mating end of said female element constitutes locking means to the interior of said annular third region of the longitudinal bore of said male element, such locking means thereby providing means for quick-fitably securing said male and female elements into mating position. Also included in the present design is a pair of normally closed inner-spring biased valves disposed at a common axial communication between the mating ends of the respective male and female elements, said inner valve acting to define a fluid flow condition at said axial communication, responsive to pre-selected fluid pressure conditions associated with either venting and/or normal fluid flow through the instant coupling. Further provided in the present design are a pair of outer-spring biased valves disposed at the outer orifices in the male and female elements, respectively, and axially opposite in location to said axial communication of said male and female elements where the outer valves act to find a fluid flow condition at said outer orifices only after venting of the inner valves has been completed. Accordingly, a normal fluid flow condition through the entire axial length of said male and female elements will occur only after both pairs of normally closed valves have become actuated into an open condition.

It is an object of the present invention to provide a quick-disconnect coupling suitable for use in high vibration, high and low pressure applications.

Another object of the invention is to provide a coupling particularly suited for use in association with machinery and other apparatus subject to continuous high and strong vibration.

It is a further object to provide a detachable coupling of the self-sealing type suitable for use in conveying compressed gases of the light gravity type, whether in liquid or vapor form, such as helium or oxygen.

It is a still further object to provide a coupling of the above type that will provide enhanced safety features as against the prior art.

It is a still further object to provide a coupling which may, even while under high pressure, be coupled and uncoupled with the use of one hand—totally eliminating the use of a wrench.

The above, other and further objects, advantages and features of the present invention will become apparent to those skilled in the art from the following description taken in conjunction with the accompanying drawings and claims, in which similar reference numerals relate to similar parts.

DETAILED DESCRIPTION OF THE INVENTION

Figure 1:
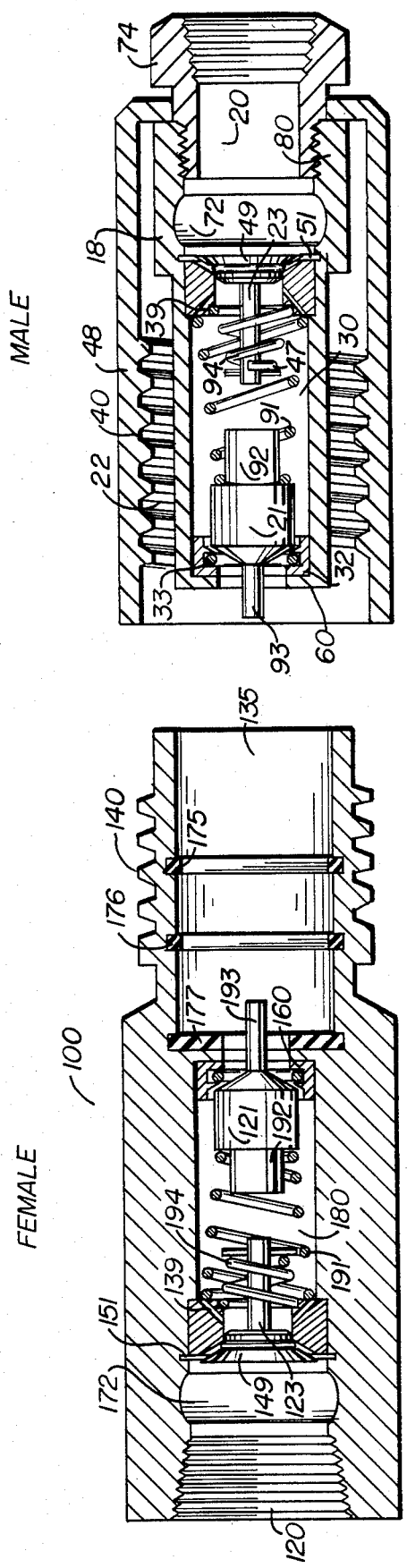
FIG. 1 is an elevational sectional view of the present coupling showing the respective male and female elements thereof completely disconnected.

Referring to FIG. 1, those reference numerals below 100 are implied with relationship to the male (or right) side of the present coupling, while those reference numerals of 100 and above are implied with reference to the female (or left) side of the coupling. As will be apparent, a male and female component having a substantially identical structure or function are both denoted by the same first digit, e.g., male element 39 would correspond to female element 139; male element 23 would correspond to female element 123, and so forth.

With reference first to the elongate male element, there is provided a longitudinal axial bore which comprises a first axial region 20 and a second axial region 30, these regions being separated by outer orifice 39. Also occurring within the male element is an annular third region 22 which substantially surrounds said second region 30. Defining the outer circumference of said annular third region 22 is a threaded interior surface 40 of elongated nut means 48. It is seen that elongated nut means 48 serves as a housing by which both inner spring valve 21 and outer spring valve 49 may be protected. It is noted that both inner valve 21 and outer valve 49 are biased into normally closed positions, this being position shown in FIG. 1 prior to connection of the elements. The structure of the inner and outer valve assemblies is shown more extensively in FIG. 4 in which, proceeding from right to left of said figure, is shown said outer valve 49, outer O-ring 52, said outer orifice 39 (which permits communication between first region 20 and second region 30), outer valve housing 55, outer valve stem 23, outer valve spring 94, and spring valve locking pin 47.

Figure 4:
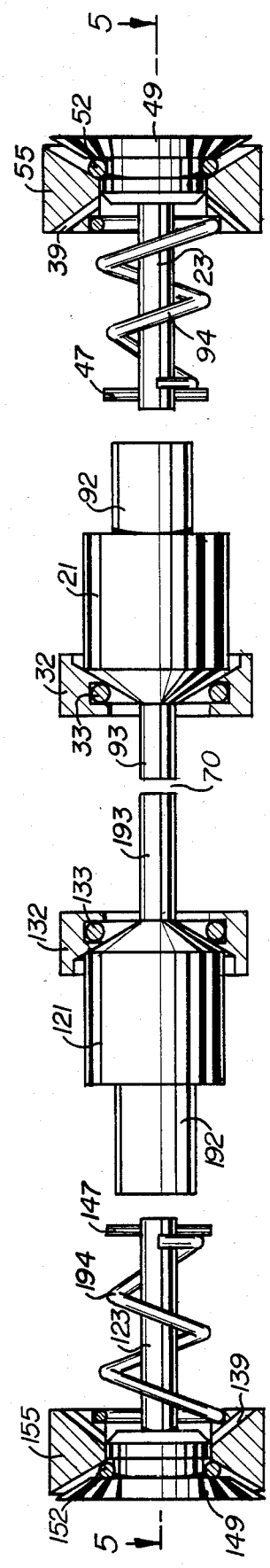
FIG. 4 is an exploded view showing more fully the inner and outer valves and their associated spring elements, housings and O-ring structures.

Proceeding to the male inner valve assembly, shown in FIG. 4, are inner valve stem 92, male inner valve 21, male communication stem 93, inner male O-ring 33, and inner valve assembly 32.

At the center of FIG. 4 is shown axial communication mating orifice 70.

Continuing to the female side of the assembly, in FIG. 4, there is shown a female axial communication stem 193, a female inner valve 121, female inner valve stem 192, female inner housing 132, and female inner valve O-ring 133.

Finally, at the far left of FIG. 4, is shown outer valve 149, outer valve stem 123, outer valve spring 194, outer valve spring locking pin 147, female outer valve housing 155 and female outer O-ring 152. Also shown is the female outer orifice (of which there are actually two) connecting female first region 120 with female second region 130.

Returning again to FIG. 1, additional illustrated elements are female third region 135 and its associated exterior threadings 140, first secondary O-ring 175 which is circumferentially disposed within third female region 135, secondary O-ring 176 which is also circumferentially disposed within the interior of third female region 135, and sealing O-ring 177 (better shown in FIG. 3) which serves a sealing and vibration absorption function when the male and female elements are fully connected and fluid flow has been initiated.

Figure 2:
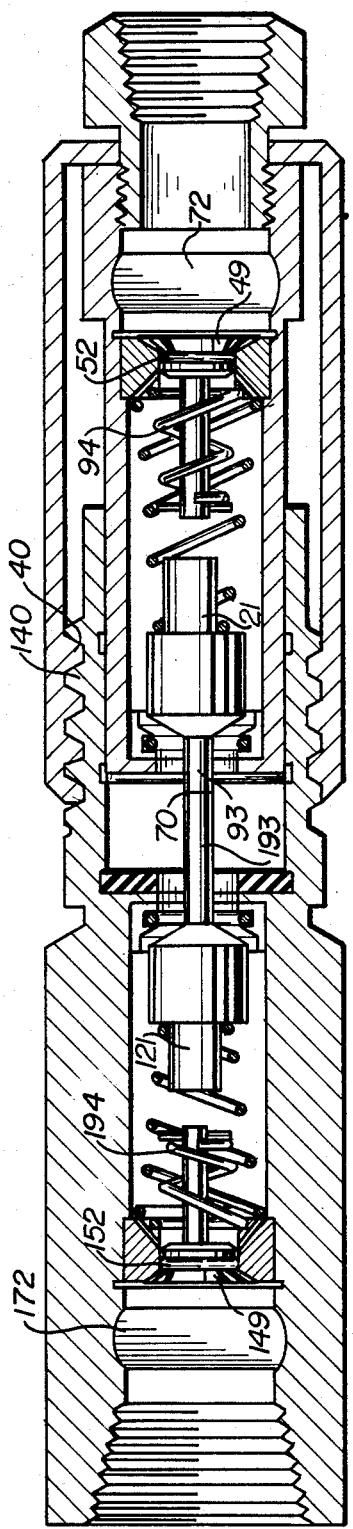
FIG. 2 is a sectional view similar to that of FIG. 1, however, showing the position of the coupling and its constituent elements during engagement of the inner valves but prior to actuation of the outer valves.
Figure 3:
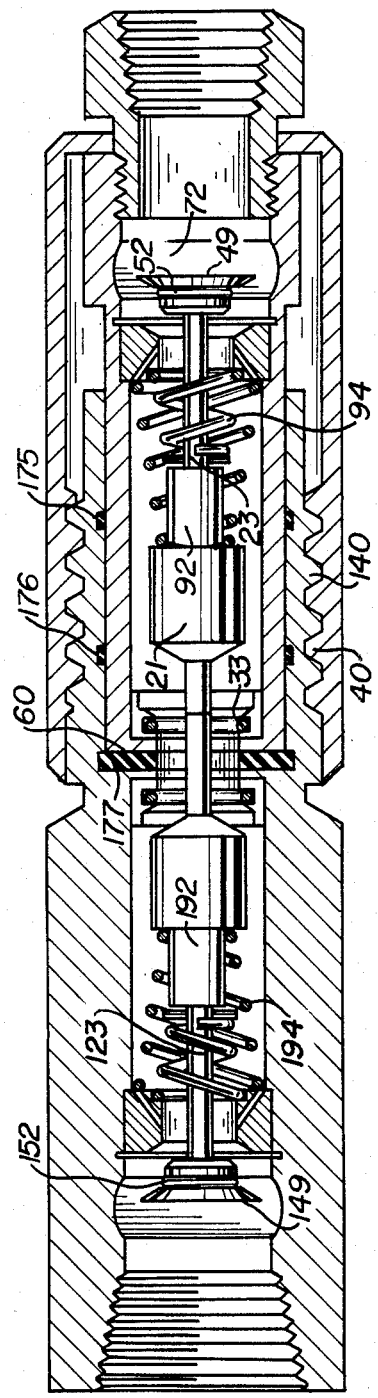
FIG. 3 is a sectional view similar to FIG. 1, however, showing the constituent elements thereof in the position which they assume after the coupling is fully connected and both inner and outer valves are fully actuated in order to permit normal fluid flow throughout.

With reference now to FIGS. 2 and 3, it is seen that the complementary threading and grooving, 140 and 40 respectively, comprise locking means by which the male and female elements may be inter-engaged to a point which will create contact between communications stems, 93 and 193 respectively, thereby closing axial communication mating area 70. As noted above, both inner and outer valves are normally closed and, accordingly, can only open when subjected to sufficient pressure along the axis thereof.

In the present design, an important safety feature is accomplished by virtue of the fact that, as shown in FIG. 2, the inner valves 21 and 121 open prior to the opening of the outer valves 49 and 149. This mode is termed venting and permits equalization of pressure to develop between the male and female sides of the coupling before actual usage thereof begins. This is an extremely important feature in that were fluid flow to initiate through a valve that had not been fully vented (achieved equal pressure throughout the regions thereof) the result could be an initially erratic flow characteristic, which could present danger to the user.

It is to be noted that by virture of the essentially symmetric design of the present invention, the same is completely reversible and, thereby, the coupling can be used in either direction and concern need not be had on the part of the user regarding which end of the assembly is to be the output and/or which the input.

It is to be additionally noted that the male and female elements are provided with fluid flow grooves 72 and 172 respectively, into which the outer valves 49 and 149 can easily move. The beginnings of the fluid flow grooves 72 and 172 are defined by the presence of locking rings 51 and 151, which prevent the outer valve assemblies, when closed, from "floating" into said fluid flow grooves.

In FIG. 3 is shown the full engagement of the thread structure 40 and 140. As a result of this maximum engagement, that is, maximum threading of the complementary threads and grooves 40 and 140, the inner valve stems 92 and 192 will coact with the outer valve stems 23 and 123 in order to urge the springs 94 and 194—and therefore the outer valves 49 and 149—into an open position. As noted, this fully open position (both inner and outer valves) can be achieved only when a user of the present coupling has engaged the thread structure 40 and 140 to its fullest possible extent. The user is thus forced to make himself aware of when the coupling is in normal, full-force flow condition and, therefore, the possibility of accidental fluid flow through the entire coupling is considerably diminished.

In high pressure environments, the outer valves 49 and 149 compress against their respective O-rings 52 and 152, the inner valves 21 and 121 compress against their respective O-rings 33 and 133, and the entire radial wall 60 of the male member compresses into the sealing O-ring 177. In such environments, secondary O-rings 175 and 176 are also of considerable importance.

In low pressure environments, the outer valves 49 and 149 make use of their respective O-rings 52 and 152, in that there exists—via the aide of the springs 94 and 194—sufficient pressure to create full engagement.

Note that in low pressure applications, the O-rings 52 and 152 seal against the inner tapered radius of outer valve housings 55 and 155; while in high pressure applications, said O-rings are forced against the outer tapered radius of outer valve housings 55 and 155, and the rear parts of the actual valves 49 and 149 (rather than said O-rings) seat against the tapered radius of outer valve housings 55 and 155. This is of critical importance because the O-rings 52 and 152 cannot distort or extrude in either direction.

Likewise, the inner valves 21 and 121 seat against the inner tapered walls of the inner valve assemblies 32 and 132 to protect the inner O-rings 33 and 133 from distortion and extrusion.

The instant coupling, due to the arrangement of the seating of the O-rings within the valve housings, can withstand severe shock—thereby eliminating one of the deficiencies of prior art coupling devices.

It is also to be appreciated that the O-rings embodied in the present invention serve to insulate it from the effects of high vibration, which has previously been a problem area in high pressure applications.

It is further to be appreciated that the present invention can, while under pressure, be coupled and uncoupled with no danger of leakage into the environment, moreover, such coupling and uncoupling can be accomplished with the use (strength) of one hand, thereby eliminating the need for a wrench.

Figure 5:
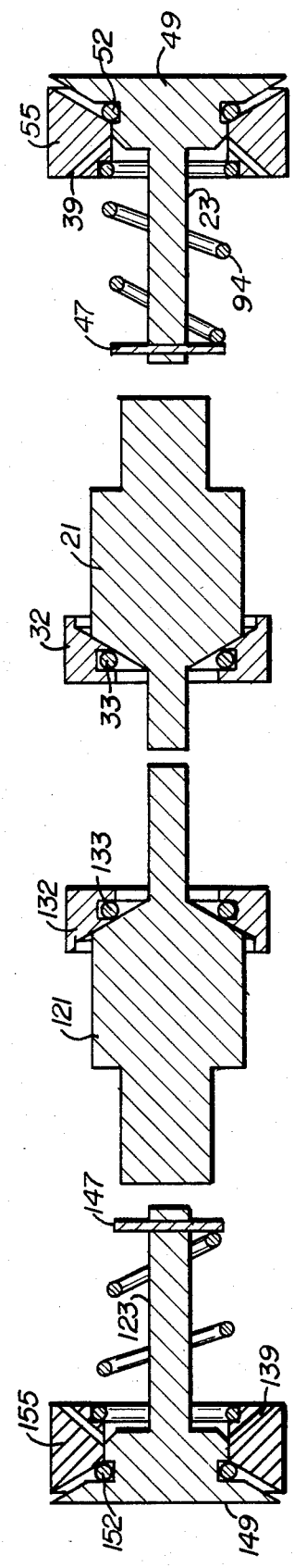
FIG. 5 is a longitudinal cross-sectional view of the exploded view of FIG. 4.

Ease of manufacture of the present design is accomplished by virture of the modularized valving and spring biasing structure, as shown in FIGS. 4 and 5.

While there has been shown and described the preferred embodiment of the present invention, it will be understood that the invention may be embodied otherwise than as herein specifically illustrated or described, and that within such embodiment certain changes in the detail, construction, form and arrangement of the parts may be made without departing from the underlying idea or principles of this invention within the scope of the appended claims.

Having thus described my invention, what I claim as new, useful and non-obvious and, accordingly, secure by Letters Patent of the United States is:

1. An anti-vibration, high and low pressure, quick-disconnect, safety coupling, comprising:
   (a) an elongate male element having a longitudinal axial bore comprising first and second regions, said regions each separated by an orifice, said male element further comprising a third annular region surrounding said second region, the outer circumference of said third annular region defining a circumferential housing of said elongate male element, the interior circumference of said third region comprising longitudinal locking means;
   (b) an elongate female element having a longitudinal bore including first, second and third regions, each separated respectively by an orifice in which the external surface of a mating end of said female element comprises a longitudinal locking means with relationship to the locking means of the interior of the circumferential housing of said third annular region of said male element, said longitudinal locking means comprising means for securing said male and female elements into a plurality of respective axial positions, one of said axial positions defining a first locking mode between the locking means of said male and female elements, said first locking mode occurring prior to axial contact between any other elements of said male and female elements;
   (c) a pair of inner-sealing valves having axial stems biased in a normally closed position, disposed upon a common axis of the respective male and female elements, said elements and said inner valves acting to define a second locking mode upon the axial advancement of said longitudinal locking means to a point of axial communication between the respective stems of said inner-sealing valves to the point of overcoming the normal closure bias of said inner valves to thereby open said inner valves, such open condition corresponding to said second locking mode; and
   (d) a pair of outer sealing valves biased in a normally closed position, disposed axially within the respective orifices of each male and female element, axially opposite the regions of axial communication between said male and female elements respectively, said outer valves acting to enable fluid flow through said orifices after said inner valves have been opened and advanced past and second locking mode, thereby defining a third locking mode ultimately characterized by fluid flow through the entire axial length of said male and female elements, in which said third locking mode will occur only after both pairs of normally-closed, inwardly-biased outer valves have become actuated into an open condition, in which that outer valve exposed to the greater external fluid pressure will open only after the opening of the opposite outer valve, such later opening caused by the eventual overcoming of the normal inward pulling bias of said outer axial valve, this caused by the axial advance of the male and female elements toward each other, into said third locking mode, whereby fluid flow toward said opposite valve through the entire coupling will occur in the direction of greatest fluid pressure.

2. The coupling as cited in claim 1 in which said inner and outer valves both comprise high and low pressure valves.

3. The coupling as cited in claim 1 in which said outer valves comprise seat valves.

4. The coupling as recited in claim 2 in which said locking means comprise complimentary thread-in-groove means.

5. The coupling as recited in claim 2 in which said locking means comprises internal threading on the inside of said third region of said male element complementary to said external threading on said third region of said female element.

* * * * *